Dec. 1, 1953  C. E. MORGAN  2,661,106
CAR TOW MECHANISM
Filed Dec. 9, 1949
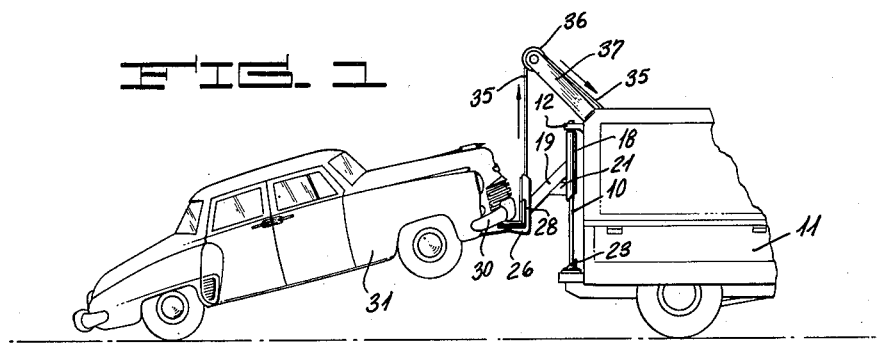
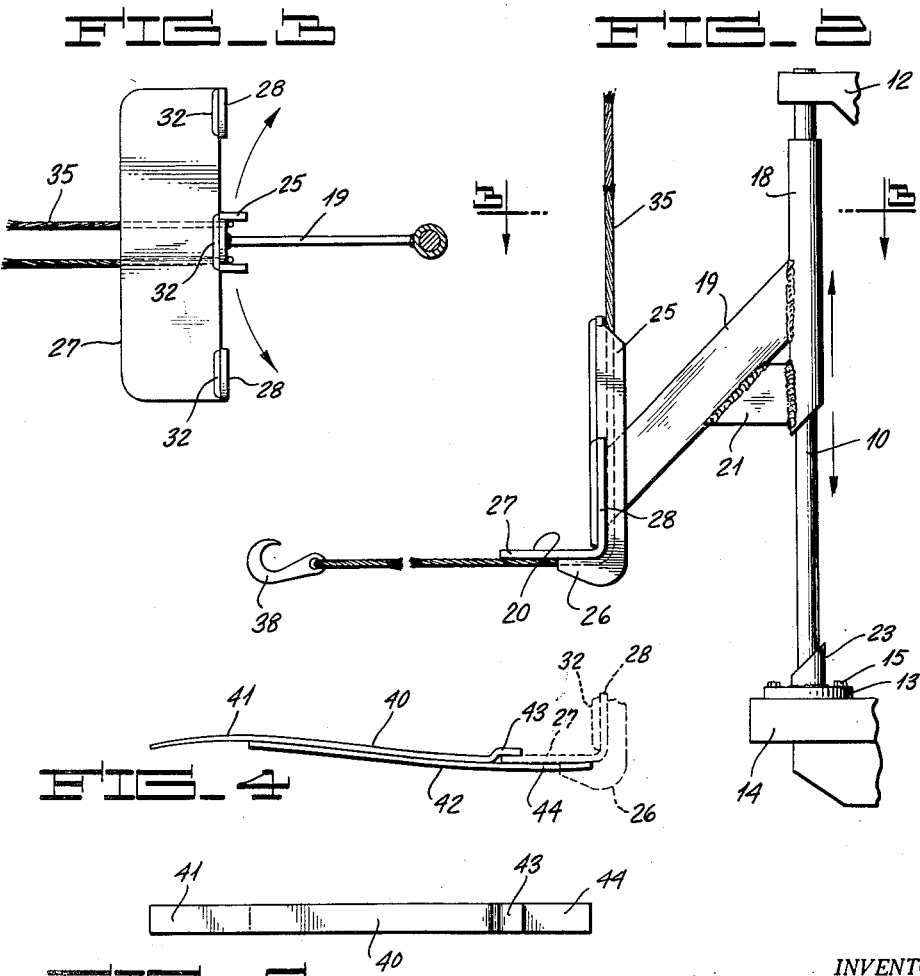
INVENTOR.
CARL E. MORGAN
BY Naylor and Lassagne
ATTORNEYS Patented Dec. 1, 1953

2,661,106

UNITED STATES PATENT OFFICE 2,661,106

CAR TOW MECHANISM

Carl E. Morgan, Grants Pass, Oreg., assignor of twenty-five per cent to Orville F. Crenshaw, and twenty-five per cent to Loren A. Davis, both of Dunsmuir, Calif.

Application December 9, 1949, Serial No. 132,130

5 Claims. (Cl. 214—86)

1

This invention relates to car tow mechanisms of the type fixed on the rear of tow or service trucks and used for the movement of disabled or wrecked motor vehicles.

It is an object of the invention to provide a tow mechanism of simplified construction which lends itself to ready attachment to service or towing vehicles of conventional design. It is a further object of the invention to provide a device of the character stated that may be readily and speedily secured to and detached from the vehicle to be towed, preferably by a single operator. Moreover, it is an object of the invention to provide a device which will more positively engage the vehicle to be towed and at the same time facilitate the handling of the same with due regard for factors of safety. Other objects will become apparent as this specification proceeds and the novelty of the device will be particularly pointed out in the appended claims.

The invention resides in the provision of a rigid post member at the rear of the towing vehicle, having a sleeve member slidably disposed on the post, the sleeve carrying a downwardly and rearwardly projecting arm with a bumper support disposed at its outer end, whereby the car to be towed may be raised by the conventional cables passing over boom means carried by the towing vehicle when the cables are extended through the bumper support and secured to a part of the disabled vehicle.

The invention additionally includes an adaptor mechanism to render the apparatus susceptible for use in the towing of vehicles of the "kneeaction" or non-rigid front wheel assembly types.

In the drawings forming a part hereof:

Figure 1 is a side elevation of the tow mechanism applied to a service truck with a passenger car shown in the towing position;

Figure 2 is a side elevation of the tow mechanism, somewhat enlarged;

Figure 3 is a sectional view taken along the line 3—3 of Figure 2;

Figure 4 is a side elevation of an adaptor member used with the device of Figure 1 in connection with cars of a particular design; and Figure 5 is a top plan view of the adaptor member of Figure 4.

The numeral 10 denotes a perpendicularly disposed standard, preferably circular in cross section, rigidly mounted at the rear of a service truck or car 11, by means of an upper bracket 12, secured to the body frame in any conventional manner (not shown), and a socket 13 secured to the frame 14 of the truck 11 by bolts 15.

2

A sleeve 18, slidably disposed on the standard 10, has a rearwardly and downwardly projecting arm 19 which carries a car support member, indicated generally by the numeral 20, at its lower end. A strut 21 secured between the sleeve 18 and the arm 19 serves to suitably brace the unit for the substantial weights involved in its anticipated use. As will be seen in Figures 1 and 2, the lower end of the sleeve is bevelled, as at 22, and socket 13 has an upstanding, complementally bevelled and fixed sleeve 23, which in combination serve to limit the pivoting of the sleeve 18 and the members carried thereby when the latter is in its lowermost or unloaded position.

The car support member 20 is formed of a channel iron 25, the main portion of which is vertically disposed and secured on the end of arm 19, as by welding, and a toe portion 26 bent outwardly at right angles to the main portion. A bumper rest plate 27 is secured to the top of toe 26 and has a pair of integral, upturned wings disposed on its inner edge adjacent the ends thereof. As will be seen in Figures 2 and 3, the wings 28 stand parallel to the perpendicular portion of the channel iron 25 and these elements combine to form a shoulder against which the bumper 30 of car 31 supported on rest 27 will bear when the disabled vehicle is cinched to the service car in the manner about to be described. (See Figure 1.) In order to prevent marring or scratching of the usually polished or plated faces of the bumper 30, the contact surfaces of the wings 28 and the vertical portion of channel iron 25 may be provided with pads of rubber or like material, as at 32.

Cables 35 are employed as the means for cinching the disabled vehicle to and actuating the hereinabove described tow mechanism. Extending from a power winch (not shown) the cables 35 run over pulleys 36 carried by boom 37, mounted on and extending rearwardly from the service truck 11, the cables running thence down the channel of member 25, on opposite sides of arm 19, under toe 26 and rest 27 for attachment to the disabled vehicle. Any conventional means of securing the cables 35 to the vehicle to be towed may be employed, such as hooks 38 secured to the free ends thereof, engageable with the cables when the latter have been looped over the axle or frame of the disabled vehicle.

The structure, hereinabove described, accommodates automobiles, trucks and busses of current model wherein the front or rear bumpers are rigidly connected to the frame of the vehicle and are intended to be used for lifting purposes.

Where vehicles of the "knee-action" type are encountered the adaptor member 40 is employed. This element (shown in Figures 4 and 5) is formed of the leaves 41 and 42 secured in partially lapped relation and fashioned along a modified S-curve. The upper leaf 41 is provided with a lip 43 which, with the underlying extended portion 44 of lower leaf 43, is engageable with the rest 27. It is the purpose of this device to provide support auxiliary to the member 20 in the case of cars the bumpers of which will not carry the full weight of the car, and thus prevent the front bumper 30 from being driven into and damaging the conventional radiator grille work.

The operation of the device is as follows: In its unloaded position the sleeve 18 is at the bottom of standard 10 with its bevelled portion 22 bearing on the complementally bevelled member 23 of socket 15, and with the auxiliary member 40 detached from rest 27 and the cables 35 drawn to put the loops 36 in the region of toe 26. To couple with a disabled car the operator merely slacks off on cables 35 to permit looping thereof over the axle or frame and engagement of loops 36, and then backs the service car 11 until rest 27 is under the front bumper 30. Power then applied on cables 35 causes the bumper 30 to be clinched on rest 27 and against the shoulder formed by the upstanding wings 28 and channel iron 25, with continuance of the pull on cables 35 applying a lifting force to the rest 27 and the portion of car 31 supported thereby, moving sleeve 18 upwardly on standard 10, until the wheels of car 31 are sufficiently clear of the ground for towing purposes. Thus suspended the car 31 is ready to be towed and able to follow the service car, as a semi-trailer, due to the pivotal action of sleeve 18 on standard 10.

Where "knee-action" cars are encountered, the operator merely fixes the auxiliary support member 40 on rest 27 prior to backing into cinching and lifting position, to the end that the under carriage is raised simultaneously with the car 31.

The invention claimed is:

1. A towing device comprising a post member, a socket member adapted for attachment to the towing vehicle to support the post in a perpendicular position, a bracket engaging the upper end of the post and for attachment to the towing vehicle, said socket and bracket together retaining the post against rotation, a sleeve slidably and pivotally disposed on the post, a downwardly and rearwardly projecting arm carried by the sleeve, a bracing strut secured between the said arm and said sleeve, a horizontally disposed car support secured to the outer end of said arm, and perpendicularly disposed stop means at the inner end of the car support.

2. A towing device comprising a post member, a socket member adapted for attachment to the towing vehicle to support the post in a perpendicular position, a bracket engaging the upper end of the post and for attachment to the towing vehicle, a sleeve slidably and pivotally disposed on the post, a downwardly and rearwardly projecting arm carried by the sleeve, a channel iron fixed on the outer end of said arm with a portion perpendicularly disposed and another portion bent outwardly to form a horizontally disposed toe, a car bumper support fixed on the toe portion of the channel iron, and a pair of upstanding shoulder members carried at the inner edge of the bumper support adjacent its opposite ends and parallel to the perpendicular portion of the channel iron.

3. A towing device comprising a post member, a socket member adapted for attachment to the towing vehicle to support the post in a perpendicular position, a bracket engaging the upper end of the post and for attachment to the towing vehicle, a sleeve slidably and pivotally disposed on said post, the upper end of said socket and the lower end of said sleeve being complementally bevelled, a downwardly and rearwardly projecting arm carried by the sleeve, a channel iron fixed on the outer end of said arm with a portion perpendicularly disposed and another portion bent outwardly to form a horizontally disposed toe, a car bumper support fixed on the toe portion of the channel iron, and a pair of upstanding shoulder members carried at the inner edge of the bumper support adjacent its opposite ends and parallel to the perpendicular portion of the channel iron.

4. In combination, a towing vehicle, a vertically disposed post mounted at the rearward end of said vehicle, a sleeve member slidably and rotatably disposed on the post, a rearwardly projecting car bumper support carried by said sleeve, and means to secure the bumper of a car onto said support and to raise said support comprising a boom mounted on said vehicle and extending rearwardly thereof to a point substantially directly above said bumper support, a sheave at the end of said boom, and a cable extending over said sheave and adapted to extend downwardly and freely along the vehicle side of said support and the bottom of said support for attachment to a car.

5. The combination set forth in claim 4 wherein said support is connected to said sleeve by a downwardly and rearwardly projecting arm, whereby said sleeve will be caused to freely slide upwardly on said post when said cable secures a car bumper to said support and is thereafter moved upwardly.

CARL E. MORGAN.

References Cited in the file of this patent

UNITED STATES PATENTS

| Number | Name | Date |
|---|---|---|
| 1,408,002 | Heymoss | Feb. 28, 1922 |
| 1,413,526 | Drake | Apr. 18, 1922 |
| 1,472,003 | Holt | Oct. 23, 1923 |
| 1,630,792 | Hahn | May 31, 1927 |
| 2,183,478 | Holmes et al. | Dec. 12, 1939 |
| 2,325,869 | Mosling | Aug. 3, 1943 |
| 2,419,145 | Kersenbrock et al. | Apr. 15, 1947 |
| 2,419,813 | Berchtold | Apr. 29, 1947 |
| 2,428,223 | Johnson | Sept. 30, 1947 |
| 2,449,146 | Ryan | Sept. 14, 1948 |
| 2,495,493 | Wright | Jan. 24, 1950 |
| 2,555,663 | Schouboe | June 5, 1951 |
| 2,582,153 | Ostrander | Jan. 8, 1952 |
| 2,610,744 | Dague | Sept. 16, 1952 |
| 2,625,278 | Sensenbaugh | Jan. 13, 1953 |

FOREIGN PATENTS

| Number | Country | Date |
|---|---|---|
| 7,768/27 | Australia | June 13, 1928 |
| 455,401 | Great Britain | Oct. 20, 1936 |